United States Patent
Bialous

[15] 3,673,278
[45] June 27, 1972

[54] FLUORINATED POLYOLEFIN MODIFIED FLAME RETARDANT POLYCARBONATE COMPOSITION

[72] Inventor: Charles Bialous, Mt. Vernon, Ind.
[73] Assignee: General Electric Company
[22] Filed: Jan. 4, 1971
[21] Appl. No.: 103,823

[52] U.S. Cl. ............................................................ 260/873
[51] Int. Cl. ........................................................ C08g 39/10
[58] Field of Search .................................................. 260/873

[56] References Cited

UNITED STATES PATENTS 3,005,795  10/1961  Busse et al. .............................. 260/873

Primary Examiner—William H. Short
Assistant Examiner—Edward Woodberry
Attorney—William F. Mufatti, Frank L. Neuhauser, Oscar B. Waddell and Joseph B. Forman

[57] ABSTRACT

A polycarbonate composition consisting of a polycarbonate and a fluorinated polyolefin. The polycarbonate may be either a homopolymer of a halogen-substituted dihydric phenol or a copolymer of an unsubstituted dihydric phenol and a halogen-substituted dihydric phenol or a mixture of the above homopolymer and copolymer, or a mixture of the homopolymer and copolymer with a homopolymer of an unsubstituted dihydric phenol. The fluorinated polyolefin is present in an amount of 0.1–3.0 weight percent and is of the type which does not form fibrils when subjected to a mechanical shearing action.

9 Claims, No Drawings

FLUORINATED POLYOLEFIN MODIFIED FLAME RETARDANT POLYCARBONATE COMPOSITION

This invention relates to a thermoplastic resin composition having improved flame retardant and drip control properties, and more particularly to a polycarbonate resin composition having in admixture a flame retardant polycarbonate resin and a particular fluorinated polyolefin.

It has been well known in the art to provide flame retardant polycarbonate compositions such as is disclosed in U.S. Pat. No. 3,334,154. It has also been known in the art to incorporate various materials with polycarbonate resins, and in particular the incorporation of polytetrafluoroethylene wherein the polytetrafluoroethylene is present in very finely divided fibrous form. Such an additive provides a thermoplastic polymeric material having improved melt properties for fabrication into shaped articles. As described in U.S. Pat. No. 3,005,795, such additives as the polytetrafluoroethylene provide high polymeric materials having melt viscosity and melt elasticity unusually higher than that normally exhibited by such polymers.

With the development and production of supersonic aircraft and other transportation vehicles wherein there is the need for utmost safety for passengers being carried therein, there is a great demand that the materials as supplied therein in the fabrication of such vehicles be flame retardant or nonflammable. Even though a thermoplastic may have flame retardant properties, it will, nevertheless, melt and drip upon exposure to heat. Such dripping can come into contact with combustibles and thereby cause burning of such combustibles. The modes of public transportation being developed are now using extensive amounts of plastic materials because of their high strength to weight ratio and because of the esthetic properties that they can impart to the vehicle. Therefore, the added safety requirements calls for plastic materials to exhibit controlled dripping. Many of the flame retardant compositions exhibit severe dripping which is conducive to spreading fire.

It has now been surprisingly discovered that by combining certain materials, improved flame retardant and minimized dripping properties are achieved.

Therefore, it is an objective of this invention to provide a novel moldable improved flame retardant polycarbonate composition.

It is a further object of this invention to provide a novel polycarbonate composition exhibiting the properties of flame retardancy and minimal dripping.

These and other objects of this invention and advantages thereof will become apparent from the following detailed description thereof.

Briefly, according to this invention, the foregoing and other objectives are attained by combining with a flame retardant aromatic polycarbonate a particular additive. The aromatic polycarbonate employed herein is one that consists of either (a) homopolymers of a halogen substituted dihydric phenol, (b) a copolymer of an unsubstituted dihydric phenol and a halogen substituted dihydric phenol, (c) a mixture of (a) and (b) or (d) a mixture of the above with a homopolymer of an unsubstituted dihydric phenol. Preferably, the mixture may be 30–99 weight percent and more particularly 70–99 weight percent of an unsubstituted dihydric phenol and, correspondingly, 70–1 weight percent and more particularly 30–1.0 weight percent of a carbonate copolymer consisting of (1) 75–25 weight percent of a halogen substituted dihydric phenol and, correspondingly, (2) 25–75 weight percent of an unsubstituted phenol, based on the total weight of (1) and (2). Particularly, this preferred system employs a tetra halogen substituted dihydric phenol and more particularly a tetrabromo bisphenol-A. The particular additive employed herein is a fluorinated polyolefin in an amount of 0.1–3.0 weight percent based on the total weight of the polycarbonate composition and wherein the fluorinated polyolefin is one which will not form fibrils when subjected to a mechanical shearing action.

The following examples are set forth to illustrate more clearly the principles and practices of this invention to those skilled in the art. Unless otherwise specified, where parts are mentioned, they are parts by weight.

EXAMPLE I

A polycarbonate composition is prepared by mixing (a) 4 parts of a homopolymer of 2,2-bis(4-hydroxyphenyl) propane (hereinafter referred to as bisphenol-A) prepared by reacting essentially equimolar amounts of bisphenol-A and phosgene in an organic medium with triethylamine, calcium hydroxide and p-tertiary butylphenol, (b) 1 part of a carbonate copolymer prepared by reacting 50 weight percent of bisphenol-A, 50 weight percent of 3,3', 5,5'-tetrabromobisphenol-A and phosgene in an organic medium with pyridine, calcium hydroxide and p-tertiary butylphenol, and (c) poly(tetrafluoroethylene),(sold by Whitford Chemical Company as Whitcon-7) in amounts as indicated in the table below, which poly(tetrafluoroethylene) does not form fibrils when subjected to mechanical shearing. The mixtures are then molded into specimens of 3 ×2 ×0.125 inches thick at 550° F., which specimens are subjected to Underwriters Laboratory Bulletin 94 Flammability Test to determine flame-out time. The results are as follows:

TABLE 1

| Flame-out Time | Average |
|---|---|
| (1) No poly(tetrafluoroethylene) | 5.2 seconds |
| (2) 0.25% of poly(tetrafluoroethylene) | 1.5 |
| (3) 0.50% of poly(tetrafluoroethylene) | 0.8 |
| (4) 0.75% of poly(tetrafluoroethylene) | 2.2 |
| (5) 1.00% of poly(tetrafluoroethylene) | 2.4 |

Sample (1) above upon exposure to the flame test drips at an average of 12 drops per specimen. Sample (2) drips at an average of 6 drops per specimen. Sample (3) drips at an average of 4 drops per specimen. Sample (4) drips at an average of 3 drops per specimen and sample (5) drips at an average of 1 drop per specimen.

EXAMPLE II

Example I is repeated as to compositions (2) through (5) of Table 1 above except that the specimens are molded at 700° F. instead of 550° F. The molded specimens were observed to have a smooth surface and did not exhibit discoloration.

EXAMPLE III

Example II is repeated except that the polycarbonate resin of Example I is mixed with poly(tetrafluoroethylene) as sold by du Pont Company, and which poly(tetrafluoroethylene) forms fibrils when subjected to a mechanical shearing action. These compositions are then molded at 700° F. and under exactly the same conditions. Upon ejection from the mold, the specimens are observed as having severe discoloration in that the specimens turned a dark brown and the surface of the molded specimens is pitted.

The instant invention is directed to a polycarbonate composition having improved flame retardant properties and minimal dripping characteristics. In addition, the particular composition so disclosed herein has excellent resistance to discoloration when molded at elevated temperatures and excellent surface characteristics. More particularly, the polycarbonate composition of this invention consists of in admixture, a polycarbonate resin and a particular fluorinated polyolefin. The polycarbonate may be either a homopolymer of a halogen substituted dihydric phenol, a copolymer of an unsubstituted dihydric phenol and a halogen substituted dihydric phenol, a mixture of the two or a mixture of (a) 70–99 weight percent of an unsubstituted dihydric phenol and, correspondingly, (b)

30–1.0 weight percent of a carbonate copolymer consisting of 75–25 weight percent of a halogen substituted bisphenol-A and, correspondingly, 25–75 weight percent of an unsubstituted dihydric phenol wherein the weight of (a) and (b) are based on the total weight thereof. The fluorinated olefin is present in an amount of 0.1–3.0 weight percent based on the total weight of the polycarbonate composition.

The fluorinated polyolefin employed herein may be either poly(tetrafluoroethylene) or a copolymer of tetrafluoroethylene and hexafluoropropylene. The critical feature of the fluorinated polyolefin is such that it has an average particle size of 0.1–2.0 micron and that when the material is subjected to a mechanical shearing action, it will not form fibrils nor will the particles stick together. Mechanical shearing can be by merely rubbing in the hands and if the particles stick together, they are not suitable for use in the practice of this invention so shown in Example III where molded specimens underwent severe discoloration and surface pitted when so used. The poly(tetrafluoroethylene) used in the practice of this invention is first sintered by heating above 330° C. thus eliminating the tendency of the particles of the poly(tetrafluoroethylene) to stick together and form a coherent paste when the mass is subjected to mechanical shearing, such as rubbing together in the hands, probably because these particles no longer tend to form ultrafine fibrils.

In general, the unsubstituted and halogen substituted dihydric phenols employed herein are the dihydric bisphenols or polynuclear aromatic compounds, containing as functional groups, two hydroxyl radicals, each of which is attached directly to a carbon atom of an aromatic nucleus. Typical of some of the dihydric phenols that may be employed in the practice of this invention are bis(4-hydroxyphenyl) methane, 2,2-bis(4-hydroxyphenyl) propane, (bisphenol-A), 2,2-bis(4-hydroxy-3-methylphenyl) propane, 4,4-bis(4-hydroxyphenyl) heptane, 2,2-(3,5,3'5'-tetrachloro-4,4'-dihydroxy-diphenyl) propane, 2,2-(3,5,3'5'-tetrabromo-4,4'-dihydroxy diphenyl propane, 3,3'-dichloro-4,4'-dihydroxy-diphenyl methane, etc. Other dihydric phenols of the bisphenol type are also available and are disclosed in U.S. Pat. Nos. 2,999,835, 3,028,365 and 3,334,154.

Generally, the polycarbonate employed herein may be prepared by reacting a dihydric phenol with a carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

It will thus be seen that the objects set forth above among those made apparent from the preceding description are efficiently attained and since certain changes may be made in carrying out the above process and in the composition set forth without departing from the scope of this invention, it is intended that all matters in the above description shall be interpreted as illustrative and not in a limiting sense.

What is claimed is:

1. An aromatic polycarbonate composition consisting of in admixture an aromatic polycarbonate of a dihydric phenol and a carbonate precursor and a fluorinated polyolefin selected from the group consisting of polytetrafluoroethylene and a copolymer of tetrafluoroethylene and hexafluoropropylene wherein said aromatic polycarbonate is selected from the group consisting of (a) a polycarbonate of a halogen substituted dihydric phenol, (b) a copolycarbonate of an unsubstituted dihydric phenol and a halogen substituted dihydric phenol, (c) a mixture consisting of (a) and (b) and (d) a mixture of a member selected from the group consisting of (a) and (b) with polycarbonate of an unsubstituted dihydric phenol, said halogen being selected from the group consisting of bromine and chlorine and said fluorinated polyolefin being present in an amount of 0.1–3.0 weight percent based on the total weight of the polycarbonate composition and wherein the fluorinated polyolefin is of the type which does not form fibrils when subjected to a mechanical shearing action.

2. The composition of claim 1 wherein the aromatic polycarbonate is a mixture of 30–99 weight percent of a polycarbonate of a dihydric phenol and, correspondingly, 70–1 weight percent of a copolycarbonate of 25–75 weight percent of a dihydric phenol, and, correspondingly, 75–25 weight percent of a tetra halogen substituted dihydric phenol, said halogen being selected from the group consisting of bromine and chlorine.

3. The composition of claim 1 wherein the aromatic polycarbonate is a copolycarbonate of bisphenol-A and 3,3',5,5'.

4. The composition of claim 1 wherein the aromatic polycarbonate is a copolycarbonate of bisphenol-A and 3,3',5,5'.

5. The composition of claim 2 wherein the aromatic polycarbonate is a mixture of (a) bisphenol-A polycarbonate and a copolycarbonate of 3,3',5,5'-tetrabromobisphenol-A and bisphenol-A.

6. The composition of claim 4 wherein the copolycarbonate is a copolycarbonate of 65 weight percent of 3,3',5,5'-tetrabromobisphenol-A and correspondingly 35 weight percent of bisphenol-A.

7. The composition of claim 1 wherein the polycarbonate is a polycarbonate of bisphenol-A and phosgene.

8. The composition of claim 1 wherein the fluorinated polyolefin is polytetrafluoroethylene.

9. The composition of claim 1 wherein the fluorinated polyolefin is a copolymer of tetrafluoroethylene and hexafluoropropane.

* * * * *

UNITED STATES PATENT OFFICE
CERTIFICATE OF CORRECTION

Patent No. 3,673,278                    Dated June 27, 1972

Inventor(s)  Charles A. Bialous

It is certified that error appears in the above-identified patent and that said Letters Patent are hereby corrected as shown below:

Column 2, TABLE 1 - cancel "Flame-out Time" and insert --Flame-out Time-- beneath "Average".

Column 3, line 36 - insert a dash --(-)-- after "dihydroxy" and close the parenthesis after "diphenyl".

Claim 3 - cancel the period "(.)" after "3,3',5,5'" and insert --tetrachlorobisphenol-A.--

Claim 4 - cancel the period "(.)" after "3,3',5,5'" and insert --tetrabromobisphenol-A.--

Signed and sealed this 25th day of December 1973.

(SEAL)
Attest:

EDWARD M. FLETCHER, JR.                RENE D. TEGTMEYER
Attesting Officer                      Acting Commissioner of Patents